US007810765B2

(12) United States Patent
Burlot

(10) Patent No.: US 7,810,765 B2
(45) Date of Patent: Oct. 12, 2010

(54) DEVICE FOR GUIDING A HOSE CONTAINING AT LEAST ONE SUPPLY LINE

(75) Inventor: Claude Burlot, Chartres (FR)

(73) Assignee: Leoni Protec Cable Systems GmbH, Schmalkalden (DE)

( * ) Notice: Subject to any disclaimer, the term of this patent is extended or adjusted under 35 U.S.C. 154(b) by 0 days.

(21) Appl. No.: 12/412,757

(22) Filed: Mar. 27, 2009

(65) Prior Publication Data

US 2009/0242707 A1 Oct. 1, 2009

Related U.S. Application Data

(63) Continuation of application No. PCT/EP2006/009378, filed on Sep. 27, 2006.

(51) Int. Cl.
*A62C 13/76* (2006.01)

(52) U.S. Cl. ...................................... 248/75; 74/490.01

(58) Field of Classification Search ................... 248/52, 248/75, 49, 68.1; 74/490.01; 901/49; 219/137.9; 174/40 R, 41

See application file for complete search history.

(56) References Cited

U.S. PATENT DOCUMENTS

| | | | | |
|---|---|---|---|---|
| 5,108,253 | A * | 4/1992 | Kobayashi et al. | 414/694 |
| 5,390,876 | A * | 2/1995 | Hatano et al. | 248/73 |
| 6,288,512 | B1 * | 9/2001 | Berninger et al. | 318/568.1 |
| 6,293,504 | B1 * | 9/2001 | Hartmann | 248/74.1 |
| 6,601,877 | B2 * | 8/2003 | Nishikawa et al. | 285/62 |
| 6,644,602 | B1 * | 11/2003 | Lundstrom et al. | 248/51 |
| 6,811,124 | B2 * | 11/2004 | Karlinger | 248/49 |
| 6,830,225 | B2 * | 12/2004 | Kato | 248/49 |
| 2003/0121350 | A1 * | 7/2003 | Hvittfeldt et al. | 74/490.01 |
| 2004/0090159 | A1 | 5/2004 | Tsutsumi et al. | |
| 2005/0095903 | A1 | 5/2005 | Stenzel et al. | |
| 2007/0158504 | A1 | 7/2007 | Burlot | |

FOREIGN PATENT DOCUMENTS

| | | | | |
|---|---|---|---|---|
| DE | 20113742 U1 | | 11/2001 | |
| JP | 01146965 | * | 3/1991 | 174/40 R |
| WO | 2005123350 A1 | | 12/2005 | |

OTHER PUBLICATIONS

International Search report dated Jun. 1, 2007.
International Preliminary report and Written Opinion dated Apr. 7, 2009.

* cited by examiner

*Primary Examiner*—Ramon O Ramirez
(74) *Attorney, Agent, or Firm*—Laurence A Greenberg; Werner H Stemer; Ralph E Locher

(57) ABSTRACT

In order to allow, in particular in the case of an industrial robot for a hose assembly to be used, a simply constructed guide element which is flexible is provided. The guide element has longitudinal compensation for the hose assembly and is formed by preferably four guide rods which are distributed uniformly on a circular line and are respectively fastened at their ends to a holding ring. The supply lines running in the hose assembly can be flexibly guided laterally out from the guide element, to any desired sides, between the guide rods. A helical spring which surrounds the hose assembly in the guide element, is provided for a restoring movement.

14 Claims, 5 Drawing Sheets

DEVICE FOR GUIDING A HOSE CONTAINING AT LEAST ONE SUPPLY LINE

CROSS-REFERENCE TO RELATED APPLICATION

This is a continuation, under 35 U.S.C. §120, of copending international application No. PCT/EP2006/009378, filed Sep. 27, 2006, which designated the United States; the prior application is herewith incorporated by reference in its entirety.

BACKGROUND OF THE INVENTION

Field of the Invention

The invention relates to a device for guiding a hose containing at least one supply line, in particular for guiding a hose assembly of an industrial robot. The device has a guide element which contains at least three guide rods and in which the hose can be guided so as to be able to move against the restoring force of a restoring element.

In many areas of application, it is necessary to connect a movably mounted machine part to supply lines (electric, hydraulic, pneumatic, data lines, etc.). For controlled guidance of the supply lines, a device is in this case often provided for guiding the supply lines and in particular for longitudinal compensation of the supply lines.

Thus, for example, international patent application WO 2005/123350 A1, corresponding to U.S. patent publication No. 2007/0158504, describes a device for guiding and for longitudinal compensation for a hose assembly of an industrial robot. The hose assembly is in this case guided in a two-part guide element containing an axial guide portion and also a compensating portion which adjoins the guide portion and in which the supply line is laterally deflected. The axial guide portion can in this case be formed by guide rods, the ends of which are adjoined by a substantially U-shaped housing in which the lateral deflecting takes place. The hose jacket of the hose assembly ends within the housing. The individual supply lines issue in the housing from the hose jacket and are guided out individually from the housing. As a result of this construction, the individual supply lines within the housing are protected from soiling.

SUMMARY OF THE INVENTION

It is accordingly an object of the invention to provide a device for guiding a hose containing at least one supply line that overcomes the above-mentioned disadvantages of the devices of this general type, which is a simple and flexible device for guiding and for longitudinal compensation for the hose with the supply lines arranged therein, in particular for a hose assembly of an industrial robot.

With the foregoing and other objects in view there is provided, in accordance with the invention, a device for guiding a hose having at least one supply line, in particular for guiding a hose assembly of an industrial robot. The device contains a storing element providing a restoring force and a guide element having at least three guide rods and in the guide element the hose can be guided so as to be able to move against the restoring force of the restoring element. The guide element has end sides, opposing one another in a longitudinal direction, formed by a front holding ring forming a hose entrance and a rear holding element. Between the front holding ring and the rear holding element, the guide rods are clamped, and the guide rods define a plurality of lateral outlet openings for the at least one supply line between in each case two adjacent guide rods.

Accordingly, the device contains a guide element in which the hose is guided, in the mounted state, so as to be able to move against the restoring force of a restoring element. The end sides, opposing one another in the longitudinal direction, of the guide element are formed by a front holding ring forming a hose entrance and a rear holding element. The guide rods are clamped between the holding ring and the holding element. At the same time, a plurality of lateral outlet openings for the at least one supply line are formed between the guide rods.

The guide element and thus the device therefore have overall a simple construction, as no further components, such as for example a housing or other components, adjoin the rear holding element. Instead, the guide element is exclusively formed between the front holding ring, the rear holding element and the guide rods arranged therebetween. The use of guide rods provides sufficiently high stability. The term "guide rods" refers in this case generally to elongate, rod-like elements which can be embodied both as bulky rods made of solid material and as pipes. The configuration as pipes offers advantages in terms of stability. At the same time, the guide rods provide very high flexibility, as a plurality of lateral outlet openings for guiding out the individual supply lines are formed by the free spaces between the individual guide rods spreading out in the longitudinal direction. In the mounted state, the individual supply lines are therefore preferably guided laterally out from the guide element. The user of the industrial robot is then free to choose to guide the supply lines out to one or other side of the industrial robot, as required. No conversion measures or the like are required. Instead, as a result of the configuration, it is possible to choose to guide the supply lines out toward any desired sides. As a result of this very high flexibility, the guide element embodied in this way is suitable across the board for all possible types of industrial robots and applications. Different guide elements therefore do not have to be configured and provided for different applications, as a result of which overall costs are kept low. At the same time, as a result of the sufficiently high stability and the elongated guide element, secure guidance and reliable compensating movement are attained, thus preventing uncontrolled looping or wrapping of the hose assembly on the robot arm. Instead, the hose assembly is guided securely and reliably close to the robot arm up to a robot hand.

The length of the guide element can be adjusted without difficulty over the length of the guide rods and lies conventionally in the range between 0.5 m and 1 m, in particular at about 0.7 m. The free cross-sectional area, which is formed between the guide rods and defines a space for receiving the hose assembly, has conventionally a diameter of about 0.1 m. Depending on the hose assembly used, the diameter can also be made larger or smaller.

According to a preferred configuration, precisely four guide rods, which are arranged distributed uniformly on a circular line, are provided. The guide element is therefore overall embodied so as to be rotationally symmetrical about its longitudinal direction, over a rotation through 90°. On the one hand, the selection of exactly four guide rods affords very good stability and, on the other hand, this forms a total of four lateral outlet openings in the four spatial directions perpendicular to the longitudinal direction. Owing to the symmetrical configuration with the four guide rods, the guide element can be mounted as desired and has always the same properties. This 90° rotational symmetry is therefore especially advantageous for the high flexibility of the guide element.

Expediently, the guide element is furthermore embodied mirror-symmetrically with respect to a mid-plane which is oriented perpendicularly to the longitudinal direction. In particular, the entire guide element is point-symmetrical with respect to a midpoint arranged in the middle on the central longitudinal axis. As a result of this high symmetry, a very simple and cost-effective construction can be attained using identical parts. At the same time, this high symmetry allows almost any desired installation position, so that no particularities have to be taken into account here and the guide element can be used without special adaptations for any desired applications. In addition, as a result of this high symmetry, the leading and the trailing end is in principle also not distinguishable, thus providing additional flexibility. On the one hand, no preferred direction has to be taken into account when installing the guide element, as the two end sides of the guide element can selectively serve as a hose entrance. At the same time, this configuration provides an additional outlet opening also at the trailing end, so that the supply lines can be guided out from the guide element on all sides, as desired. The supply lines can therefore be guided out from the guide element toward the right, left, top, bottom or else toward the rear.

Expediently, provision is therefore made for the rear holding element to be embodied so as to be identical to the front holding ring.

In order to allow simple mounting of the hose assembly, the two holding rings can be separated, preferably in each case along a dividing plane. In particular, the holding rings are in this case formed from two annular segments which are screwed to each other. It is also possible for the two annular segments to be joined together so as to be foldable at their one side, so that the two annular segments are non-detachably fastened to each other. As the entire guide element is formed merely by the guide rods and the annular segments, the separating or unfolding of the annular segments allows the entire guide element to be opened or unfolded, so that the hose assembly can be inserted or exchanged without difficulty.

In order to keep the diversity of parts for the guide element as small as possible, in an expedient configuration and in extension of the strict notion of symmetry, the holding rings are formed from preferably two identical annular segments.

For gentle insertion of the hose assembly into the holding ring forming the hose entrance, a funnel-shaped hose insertion element is preferably held in the holding ring. The hose insertion element is for example a rubber or else plastics material bush having a low coefficient of friction. Expediently, the hose insertion element forms at the same time a counter bearing for the restoring element, which is supported on the guide element via this hose insertion element.

According to an expedient configuration, the guide rods are additionally provided with an abrasion-resistant sheathing to allow, in particular, low-friction sliding of the hose assembly. At the same time, this sheathing, which is embodied for example in the manner of a sliding coating, serves as abrasion protection for the guide rods. The sheathing is made in particular of a plastics material having a low coefficient of friction, for example a Teflon coating. Expediently, two visually distinguishable coatings, for example of different colors, are in this case provided and are attached, one above the other, to the guide rods. As a result of the visual distinguishability, a wear indicator is formed. Alternatively to the configuration as a coating, the sheathing can also be a hose-like protective sheath pulled over the metallic guide bars.

A fastening element is provided for fastening the guide element to the industrial robot or generally to a device. The guide element is in this case fastened with its two end-side holding rings to the fastening element. For this purpose, the two holding rings expediently each have two mutually opposing, flattened fastening sides.

In an expedient configuration, a plurality of guide elements are fastened, arranged next to one another, to the industrial robot. As a result of the very simple and compact construction, overall a plurality of the guide elements can be fastened to an industrial robot, thus allowing a plurality of hose assemblies to be guided in parallel to the robot hand. This offers for example the possibility of providing, for different machining tools which are fastened to the robot hand, differently specialized hose assemblies and of leaving these on the robot in the individual guide elements, so as not to have to retrofit them regularly. When the machining tool is exchanged, the hose assembly associated with the machining tool is merely connected to the machining tool.

Overall, in a preferred configuration, the hose is, in the mounted position, inserted through the front holding ring, the hose jacket of which extends up to a hose stop arranged in the guide element. The hose stop is formed by a bulb-like end piece on the hose, which is clamped onto the end of the hose, for example as an annular element. The end piece is in particular a plastic material element having a low coefficient of friction and serves at the same time as a sliding element via which the hose is supported on the guide rods. At the same time, the hose stop serves as a stop for a helical spring which acts as a restoring element and is clamped between the hose stop and the front holding ring, in particular the hose insertion element. The supply lines issue from the end of the hose jacket, in the portion adjoining the hose stop, and are guided laterally between two adjacent guide rods out from the guide element to a connection interface. The connection interface is in this case fastened for example directly to the guide element or else to a robot arm. From this hose interface, the supply line leads along the robot on to a supply station. The entire hose assembly therefore extends from this connection interface to a front coupling part of the hose assembly, with which the hose assembly is fastened to the machining tool which is arranged on the robot hand for the respectively desired machining.

According to an expedient development, provision is made for a plurality of supply lines to be combined in groups and the groups to be guided out from the guide element in each case on different sides. This again underlines the high flexibility of the guide element and allows different types of interfaces to be fastened without difficulty in different positions of the robot, as the individual supply lines can be guided out from the guide element without difficulty at different sides.

Other features which are considered as characteristic for the invention are set forth in the appended claims.

Although the invention is illustrated and described herein as embodied in a device for guiding a hose containing at least one supply line, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
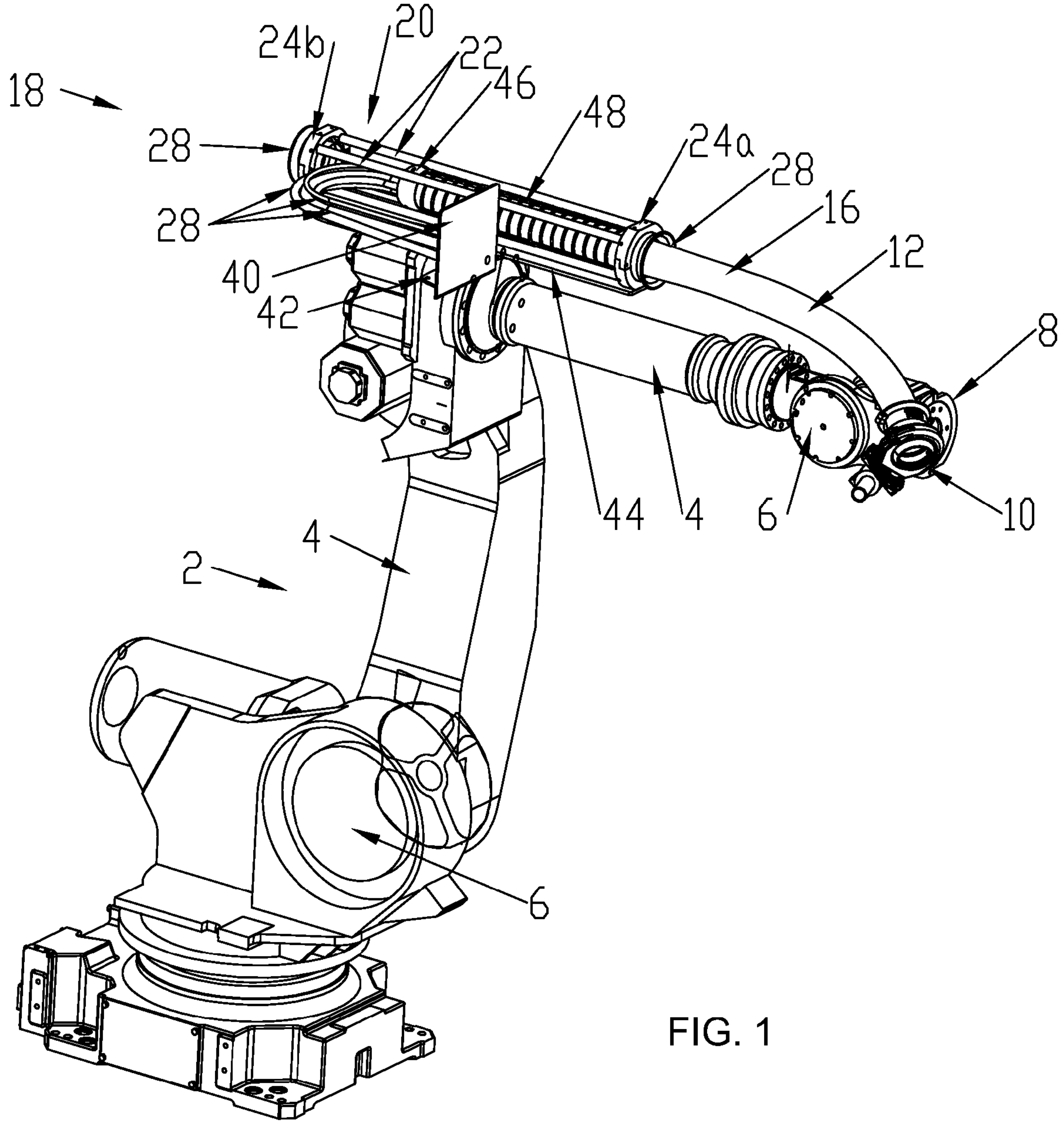
FIG. 1 is a diagrammatic, perspective view of a multiaxle industrial robot with a guide element and a hose assembly guided therein according to the invention.

In the figures, like parts are provided with the same reference numerals. Referring now to the figures of the drawing in detail and first, particularly, to FIG. 1 thereof, there is shown an industrial robot 2 having a plurality of robot arms 4 which can pivot relative to one another about axes of rotation 6. Overall, this is a conventional, 6-axle industrial robot, such as is used for example in the automotive industry in the assembly of motor vehicles. A coupling point 8, onto which a machining tool can be exchangeably coupled, is provided on the last robot arm 4. The machining tool can be embodied in different ways. Depending on the nature of the machining tool, it must be supplied in different ways. The machining tool is for example a welding tool, a screwing or punching tool or else a cutting tool. Electric, pneumatic, hydraulic components and also sensors, etc. can therefore be provided on the machining tool itself. In order to supply the machining tool in a suitable manner, it is connected to a hose assembly 12 via a coupling part 10. In the hose assembly 12, a plurality of supply lines 14 are conventionally guided individually as individual components. These supply lines 14 are for example pneumatic, hydraulic, electric lines or else data lines, etc. The supply lines 14 are surrounded by a hose jacket 16 which is embodied for example as a corrugated pipe or else as a special plastic material hose and in which the supply lines 14 are guided with a certain movability. Owing to the movements, required during the machining of a workpiece, of the robot 2 or else of the machining tool, the hose assembly 12 must overall be flexible and in particular it must be able to be fed to the machining tool in a longitudinal direction 18. In order to guide the hose assembly 12 as close as possible and parallel to the upper robot arm 4, a guide element 20 is provided on the industrial robot 2. In the guide element, at least a portion of the hose assembly is guided in the longitudinal direction 18. At the same time, the guide element 20 allows a compensating movement in the longitudinal direction, i.e. withdraws the hose assembly 12 into a starting position, so that the hose assembly 12 displays overall in each machining situation a certain tensile stress and does not perform any uncontrolled movements.

Figure 2:
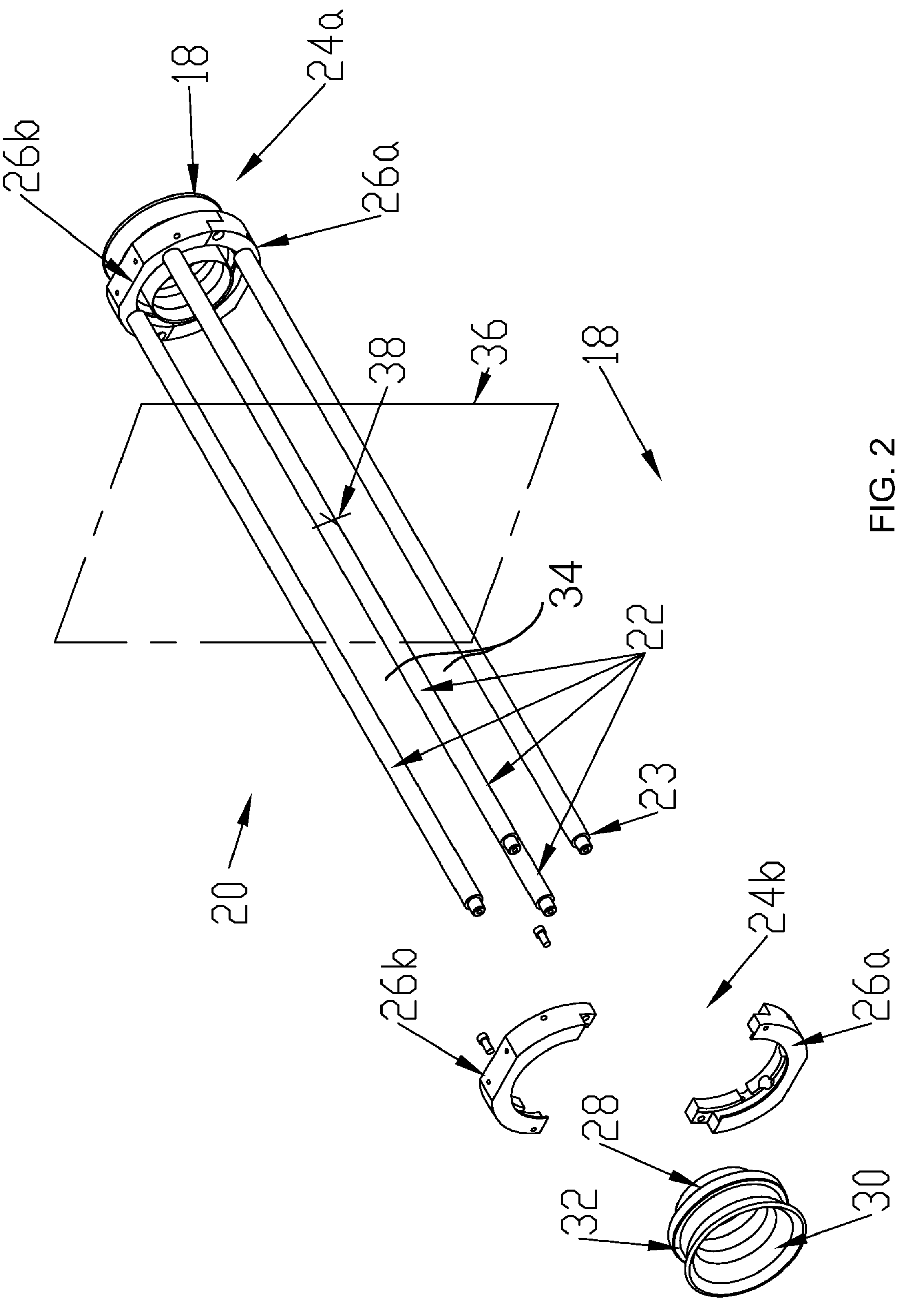
FIG. 2 is a diagrammatic, perspective, partly exploded view of the guide element.

The guide element 20, the special construction of which may be seen in particular from FIG. 2, is formed substantially by four pipe-like guide rods 22 and also a front holding ring 24*a* and a rear holding ring 24*b*. The guide rods 22 are clamped between the two holding rings 24*a*, 24*b* and form, viewed in cross section, the corner points of a square. They are therefore arranged, distributed uniformly over 90°, on a circular line, the diameter of the circle corresponding to the diagonal line between the opposing corner points of the square. The holding rings 24*a*, 24*b* are each in turn formed by two identically embodied annular segments 26*a*, 26*b* which are fastened to each other via screws. A respective hose insertion element 28 is clamped in each holding ring 24*a*, 24*b*. The hose insertion element has a funnel-shaped insertion opening 30 and also a peripheral annular groove with which a corresponding annular web on the holding rings 24*a*, 24*b* engages in a form-fitting manner.

The hose insertion elements 28 are made of a plastic material and have a coefficient of sliding friction which is as low as possible to allow gentle insertion of the hose assembly 12 into the guide element 20. The guide rods 22 and also the holding rings 24*a*, 24*b* are made, on the other hand, of a metal, in particular steel having high rigidity. The guide rods 22 are additionally protected by an abrasion-resistant sheathing 23 made of a plastic material.

A respective lateral outlet opening 34 is formed between two adjacent guide rods 22 over the entire length of the guide rods 22 and thus substantially over the entire length of the guide element 20.

As a result of the special construction illustrated here, the entire guide element 20 displays high symmetry and is embodied mirror-symmetrically to a mid-plane 36 illustrated by broken lines and also in particular point-symmetrically to a midpoint 38. The mid-plane 36 is in this case the plane perpendicular to the longitudinal direction 18 in the middle of the guide element and the midpoint 38 is the point lying on the axis of rotation in this mid-plane 36.

The construction of the guide element 20 produces, in a configuration which is as simple as is conceivably possible, has high flexibility, and thus opens up a broad range of possible applications. Critical in this regard are the lateral outlet openings 34 which are formed between the guide rods 22 and through which, in each case selectively, the individual supply lines 14 can be laterally guided out. In addition, it is also possible to guide the supply lines 14 or else the entire hose assembly 12 back out from the guide element 20 through the rear holding ring 24*b*.

The high flexibility will be illustrated hereinafter, in particular with reference to FIGS. 1, and 3 to 5. In the exemplary embodiments according to FIGS. 1, 3 and 4, the supply lines 14 are in each case guided laterally and individually out from the guide element 20 to a connection interface 40. The connection interface 40 is illustrated merely schematically and conventionally has plugged-in couplings for attaching the individual supply lines 14. Feed lines, which are guided along the robot 2 and are connected to the supply lines 14 via the connection interface 40, lead to the connection interface 40.

As may be seen from the figures, the guide element 20 allows the supply lines 14 to be guided out from the guide element 20 both laterally (right-left) and upwardly. In the exemplary embodiments, the connection interface 40 is in this case connected to the guide element 20 via a holding bracket 42. This takes place either by direct fastening of the holding bracket 42 to the guide element 20, in particular to the holding ring 24*a* (FIG. 3), or else by indirect fastening of the holding bracket 42 to a fastening plate 44 serving as the fastening element. The guide element 11 is fastened to the robot 2 generally via the fastening plate 44. The fastening plate 44 runs in this case in the longitudinal direction 18 parallel to the upper robot arm 4.

Figure 4:
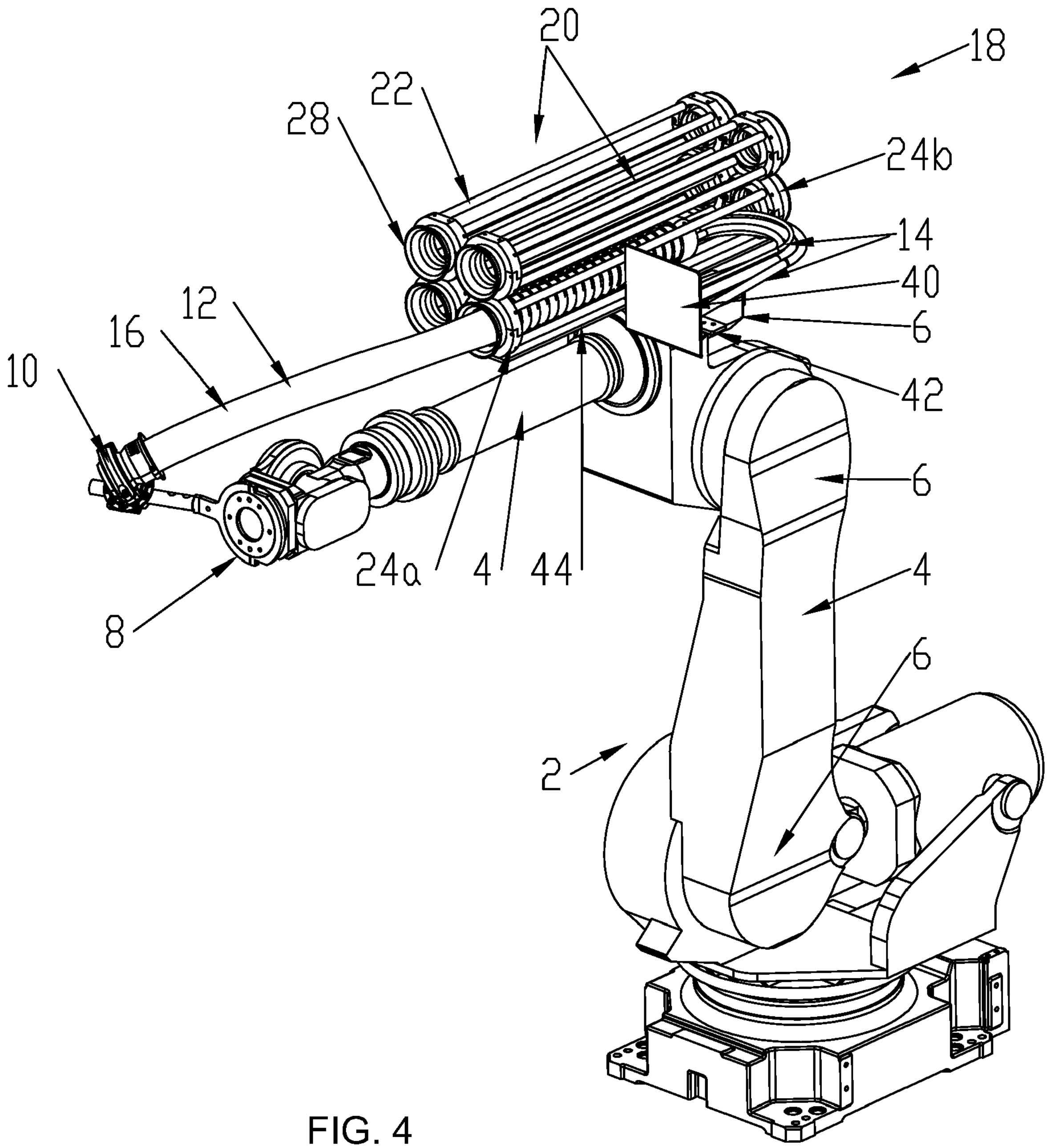
FIG. 4 is a diagrammatic, perspective view of the industrial robot according to FIG. 1 with a plurality of guide elements arranged next to one another in pairs.

Finally, the variant embodiment according to FIG. 4 shows a variant with a total of four guide elements 20 arranged next to one another in a square. This arrangement is facilitated in that each guide element 20 has outlet openings 34 on all sides, so that a lateral or an upper outlet opening 34 remains free for each guide element 20. In addition, the very simple and compact configuration of the individual guide element 20 allows an arrangement which overall saves space.

Figure 3:
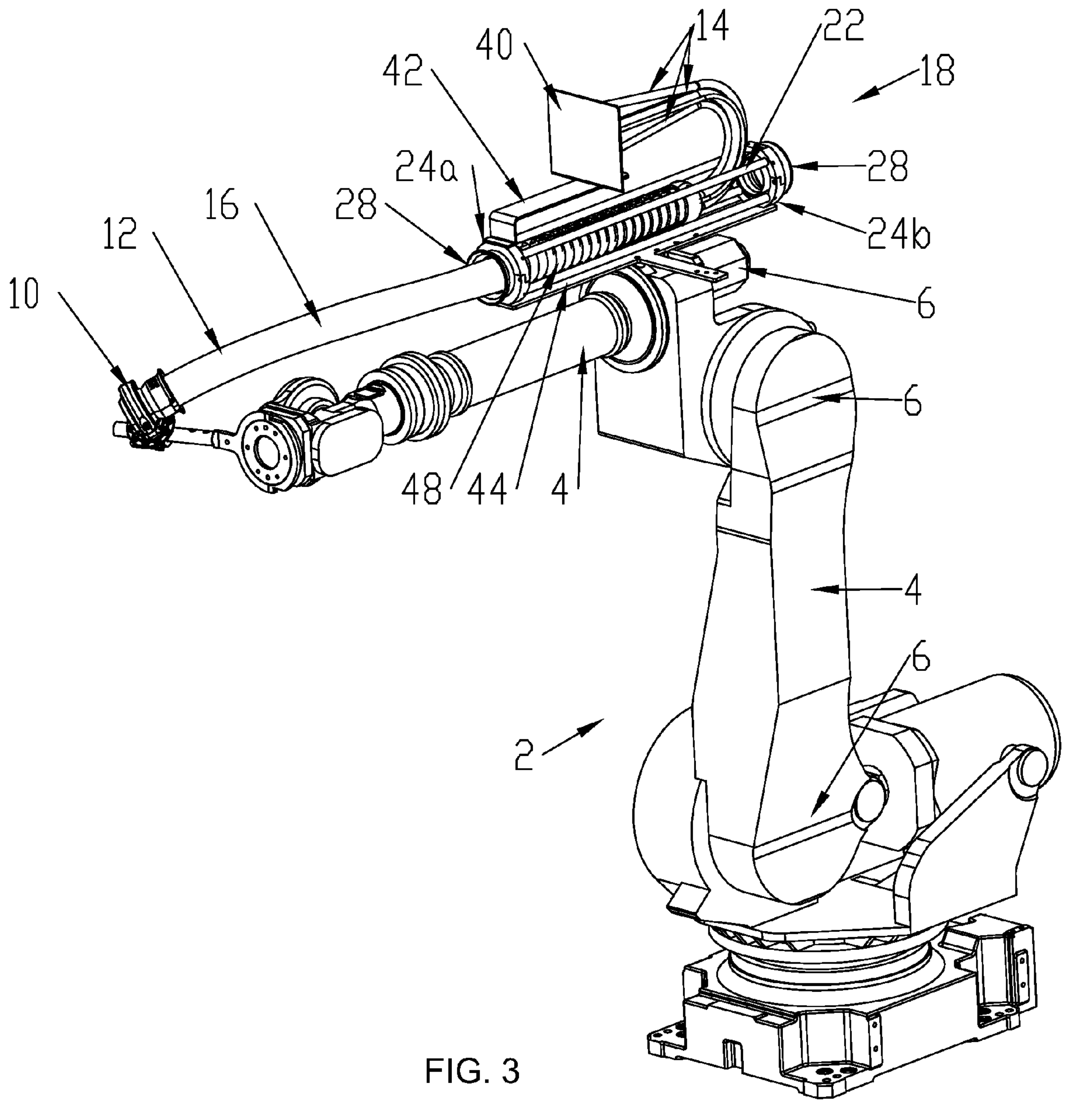
FIG. 3 is a diagrammatic, perspective view of the industrial robot according to FIG. 1 in an alternative application of the guide element.

In the variant embodiments of FIGS. 1, 3 and 4, the hose jacket 16 ends in each case within the guide element 20 at a bulb-like hose stop 46. The hose stop 46 is in this case in particular a ring attached to the hose jacket 16. The hose stop 46 serves, on the one hand, for sliding mounting of the hose assembly 12 in the guide element 20. Of particular importance in this case is the bulb-like embodiment and also the configuration of the guide element 20 with the guide rods 22. That is to say, this forms a total of just four point-by-point contacts between the hose assembly 12 and the guide rods 22, thus allowing the hose stop 46 to be displaced with as little friction as possible. Furthermore, the hose stop 46 serves as a counter bearing for a helical spring 48 which is used as the restoring element and surrounds the hose jacket 16. At the other end, the helical spring 48 is supported in the region of the front holding ring 24a, in particular on the hose insertion element 28 arranged there. The hose insertion element 28 has for this purpose, in particular, a corresponding groove in which the end side of the helical spring 48 rests.

Figure 5:
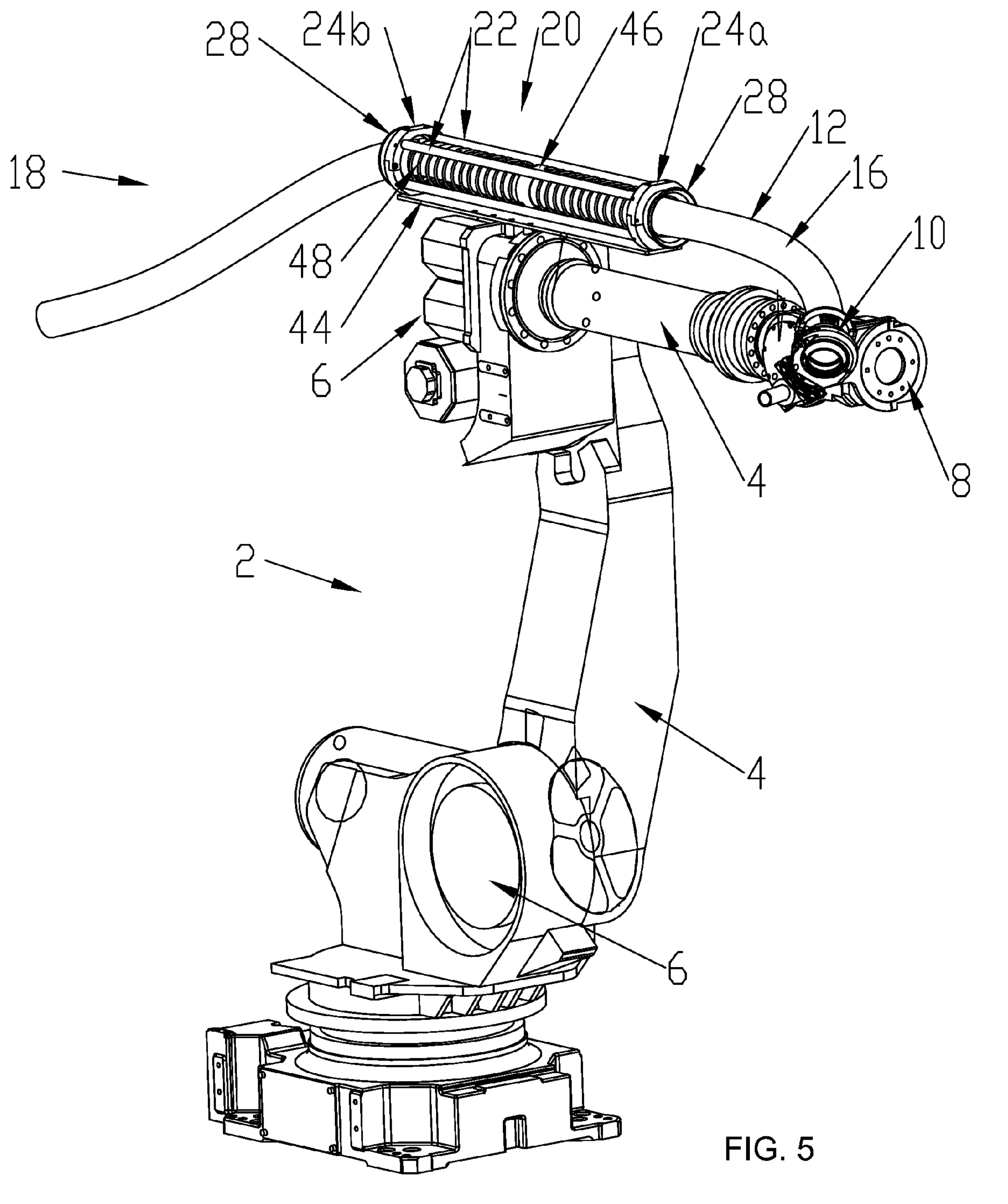
FIG. 5 is a diagrammatic, perspective view of the industrial robot according to FIG. 1, in which the hose assembly is guided through the guide element.

The variant embodiment according to FIG. 5 shows a configuration in which the hose assembly 12 is guided overall in the longitudinal direction 18 through the guide element 20. Overall, the guide element 20 can therefore be used in such a flexible manner that not only can the supply lines 14 be individually guided out laterally or toward the rear, but rather the complete hose assembly 12 can also—if necessary—be guided through the guide element 20. In the exemplary embodiment of FIG. 5, two helical springs 48 are provided, which are arranged on both sides of the hose stop 46 and bring, as a result of their restoring forces, the hose assembly 12 into a defined starting position, for example a mid-position. The helical springs 48 are embodied as compression springs. Alternatively to the variant embodiment illustrated in FIG. 5, the helical spring 48, which then exerts merely a restoring force, is provided merely in the front partial region between the hose stop 46 and the front holding ring 24a.

The invention claimed is:

1. A device for guiding a hose having at least one supply line, in particular for guiding a hose assembly of an industrial robot, the device comprising:
a storing element providing a restoring force; and
a guide element having at least three guide rods and in said guide element the hose can be guided so as to be able to move against the restoring force of said restoring element, said guide element having end sides, opposing one another in a longitudinal direction, formed by a front holding ring forming a hose entrance and a rear holding element, between said front holding ring and said rear holding element said guide rods are clamped, said guide rods defining a plurality of lateral outlet openings for the at least one supply line between in each case two adjacent said guide rods.

2. The device according to claim 1, wherein said at least three guide rods are four guide rods, which are disposed distributed uniformly on a circular line.

3. The device according to claim 1, wherein said guide element is embodied mirror-symmetrically with respect to a mid-plane perpendicular to the longitudinal direction.

4. The device according to claim 1, wherein said rear holding element is identical to said front holding ring.

5. The device according to claim 1, wherein said front holding ring and said rear holding element can be separated along a dividing plane.

6. The device according to claim 1, wherein said front holding ring is composed of a plurality of identical annular segments.

7. The device according to claim 1, further comprising a funnel-shaped hose insertion element held in said front holding ring.

8. The device according to claim 1, further comprising a sheathing disposed on said guide rods.

9. The device according to claim 8, wherein said sheathing includes two visually distinguishable sheathings.

10. The device according to claim 1, further comprising a fastening element, said guide element is fastened with said front holding ring and said rear holding element to said fastening element via which said guide element is fastened to the industrial robot.

11. The device according to claim 1, wherein said guide element is one of at least two guide elements, disposed next to one another, and are fastened to the industrial robot.

12. The device according to claim 1, further comprising:
a connection interface;
a hose stop disposed in said guide element; and
a hose jacket extending up to said hose stop, the hose being inserted through said front holding ring and said hose jacket, said storing element being a spring is guided around said hose jacket and is clamped between said hose stop and said front holding ring, and in that a plurality of supply lines issue from said hose jacket and are guided, laterally between two adjacent said guide rods, out from said guide element to said connection interface.

13. The device according to claim 1, wherein the supply line is one of a plurality of supply lines combined in groups and the groups are guided out from said guide element on different sides.

14. The device according to claim 1, wherein said holding ring is composed of two identical annular segments.

* * * * *